United States Patent [19]
Kinoshita et al.

[11] Patent Number: 5,657,006
[45] Date of Patent: Aug. 12, 1997

US005657006A

[54] CAPACITANCE TYPE ROTATION ANGLE SENSOR

[75] Inventors: Motohiro Kinoshita; Fumitoshi Masuda; Masanori Oshima; Hiromu Okunishi; Kiminori Yamauchi, all of Kyoto, Japan

[73] Assignee: Murata Manufacturing Co., Ltd., Japan

[21] Appl. No.: 605,687

[22] Filed: Feb. 22, 1996

Related U.S. Application Data

[63] Continuation of Ser. No. 233,312, Apr. 26, 1994, abandoned.

[30] Foreign Application Priority Data

Apr. 26, 1993 [JP] Japan ................... 5-123302

[51] Int. Cl.$^6$ ................... G08C 19/10
[52] U.S. Cl. ................... 340/870.37; 324/660; 361/298.1
[58] Field of Search ................... 340/870.37, 870.31, 340/870.32; 324/660, 679, 457, 458; 73/514.01, 509; 361/277, 289, 290, 298.1

[56] References Cited

U.S. PATENT DOCUMENTS 4,092,579  5/1978  Weit ................... 318/662

FOREIGN PATENT DOCUMENTS

| | | | |
|---|---|---|---|
| 3328421 | 2/1984 | Germany. | |
| 253670 | 1/1988 | Germany. | |
| 37110624.1 | 10/1988 | Germany | 340/870.37 |
| 4-172218 | of 0000 | Japan. | |
| 55-88109 | of 0000 | Japan. | |

*Primary Examiner*—Jeffery Hofsass
*Assistant Examiner*—Ashok Mannava
*Attorney, Agent, or Firm*—Ostrolenk, Faber, Gerb & Soffen, LLP

[57] ABSTRACT

A movable electrode is positioned between two fixed electrodes. The movable electrode is rotated in correspondence to a rotation angle to be detected. The fixed electrodes and the movable electrode are split into first split electrode members and second split electrode members not conducting with each other respectively. The first fixed split electrode members are electrically connected with a first external terminal, and the second fixed split electrode members are electrically connected with a second external terminal. Thus, electrostatic capacitances which are derived from the external terminals are varied by rotation of the movable electrode. In this sensor, the varied electrostatic capacitances can be derived through conductive paths comprising no sliding contact portions, while a variable range of the electrostatic capacitances can be increased.

15 Claims, 8 Drawing Sheets

CAPACITANCE TYPE ROTATION ANGLE SENSOR

This invention is a file wrapper continuation of Ser. No. 08/233,312 filed Apr. 26, 1994 now abandoned.

BACKGROUND OF THE INVENTION

1. Field of the Invention

The present invention relates to a rotation angle sensor which detects a rotation angle by amounts of changes in electrostatic capacitance.

2. Description of the Background Art

Figure 7:
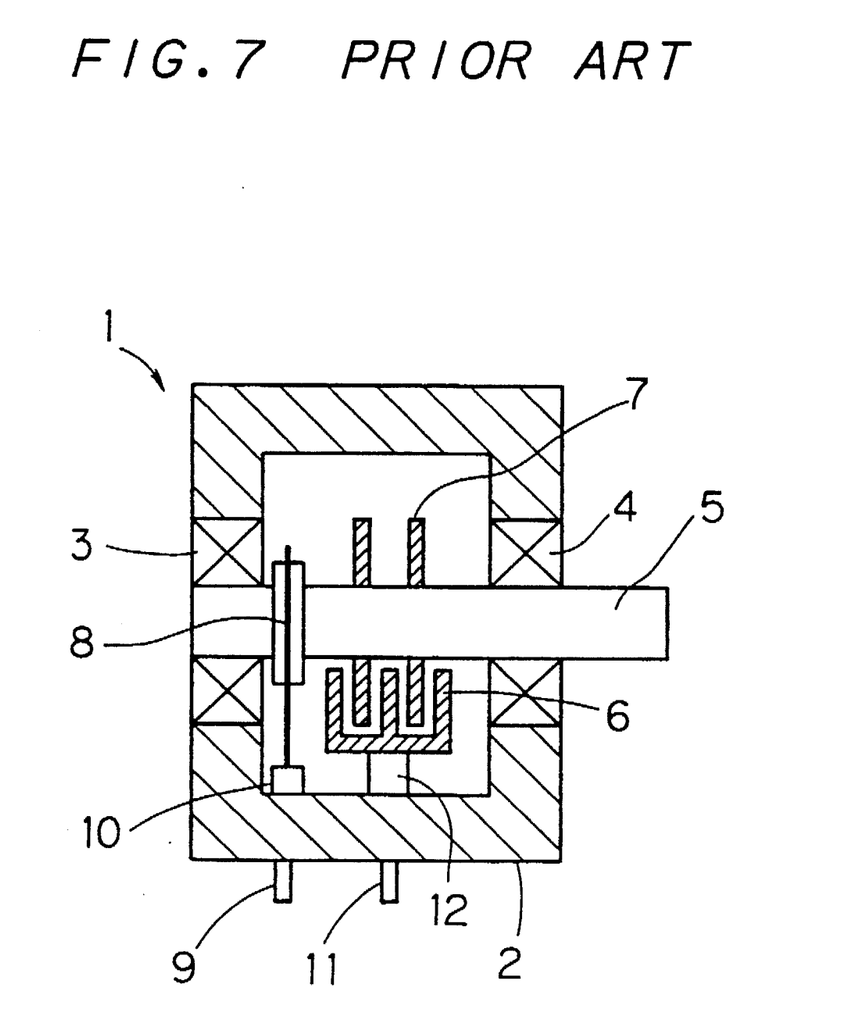
FIG. 7 is a longitudinal sectional view showing a capacitance type rotation angle sensor according to first prior art, which is of interest to the present invention.

FIG. 7 shows a capacitance type rotation angle sensor 1, which is of interest to the present invention. This rotation angle sensor 1 is described in Japanese Utility Model Application Laying-Open No. 55-88109 (1980).

This sensor 1 comprises a housing 2 consisting of a metal. The housing 2 rotatably holds a shaft 5 through bearings 3 and 4. At least a portion of the shaft 5 which is positioned in the housing 2 is made of a metal to be electrically insulated with respect to the housing 2.

The housing 2 is provided therein with a plurality of fixed electrodes 6 and a plurality of rotational electrodes 7 which are positioned between the fixed electrodes 6. The rotational electrodes 7 are mounted on the shaft 5. The shaft 5 is in sliding contact with a collector 8, consisting of a piano wire, for example, which is electrically connected with an external terminal 9. The external terminal 9 passes through the housing 2 via an insulating bushing 10. The insulating bushing 10 is also adapted to hold the collector 8.

On the other hand, the fixed electrodes 6 are electrically connected to another external terminal 11. The external terminal 11 passes through the housing 2 via another insulating bushing 12. The insulating bushing 12 is also adapted to hold the fixed electrodes 6.

The shapes of the fixed electrodes 6 and the rotational electrodes 7 are so selected that overlap areas thereof are varied with changes in rotation angle of the shaft 5. The shaft 5 is rotated in response to a rotation angle to be detected. Therefore, the overlap areas of the fixed and rotational electrodes 6 and 7 are varied in correspondence to the rotation angle to be detected, so that an electrostatic capacitance which is formed by the fixed and rotational electrodes 6 and 7 is changed in response thereto. This electrostatic capacitance is derived from the external terminals 9 and 11. Thus, it is possible to recognize the rotation angle to be detected by a change of the electrostatic capacitance.

In the aforementioned sensor 1, however, conductive paths connecting the rotational electrodes 7 with the external terminal 9 include a portion of the collector 8 which is in sliding contact with the shaft 5, and hence the electrical properties and the life of this sensor 1 depend on the state of the collector 8, which is in sliding contact with the shaft 5, and the life of the collector 8 itself. Consequently, this sensor 1 is insufficient in reliability and durability.

Figure 8A:
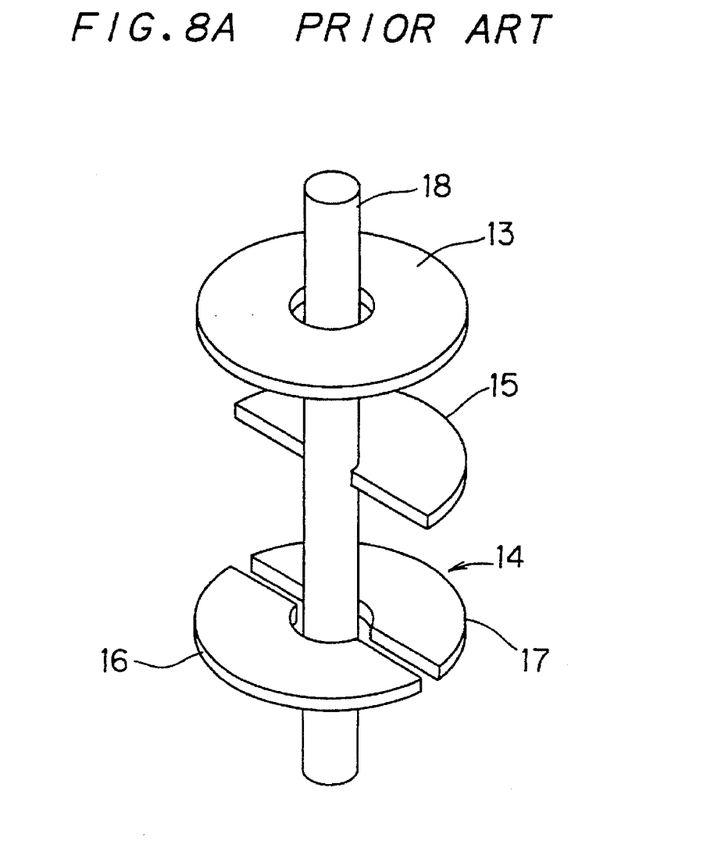
FIG. 8A is a perspective view illustrating principal elements included in a capacitance type sensor according to second prior art, which is of interest to the present invention.
Figure 8B:
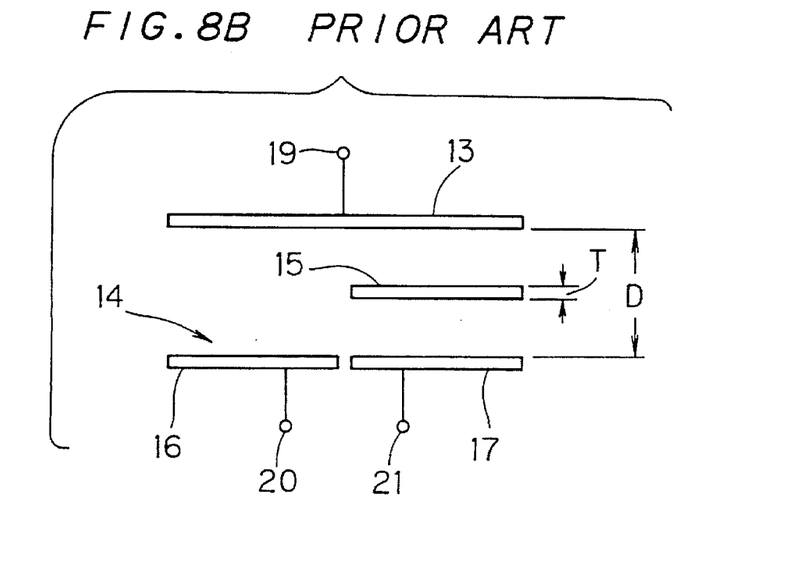
FIG. 8B is a front elevational view illustrating the elements shown in FIG. 8A.

On the other hand, FIGS. 8A and 8B show principal elements which are included in another type of capacitance type rotation angle sensor which is of interest to the present invention. This rotation angle sensor is described in Japanese Patent Application Laying-Open No. 4-172218 (1992).

As shown in FIGS. 8A and 8B, this sensor comprises first and second fixed electrodes 13 and 14 which are opposed to each other, and a rotational plate 15 consisting of a ferroelectric substance which is inserted between the fixed electrodes 13 and 14. The first fixed electrode 13 has a circular shape, while the second fixed electrode 14 is split into first and second fixed split electrode members 16 and 17 having semicircular shapes respectively. The rotational plate 15, which is in the form of a semicircle, is mounted on a rotatably held shaft 18. First, second and third external terminals 19, 20 and 21 are electrically connected to the first fixed electrode 13, the first fixed split electrode member 16 and the second fixed split electrode member 17 respectively.

In this sensor, the shaft 18 is rotated in correspondence to a rotation angle to be detected. In response to this rotation of the shaft 18, the rotational plate 15 is so rotated that an electrostatic capacitance which is formed between the first fixed electrode 13 and the first fixed split electrode member 16 and that formed between the first fixed electrode 13 and the second fixed split electrode member 17 are differentially changed and such differentially changed electrostatic capacitances are derived by the first and second external terminals 19 and 20 and the first and third external terminals 19 and 21 respectively.

The aforementioned sensor solves the problem encountered in the sensor 1 shown in FIG. 7, i.e., the problem that the electrical properties and the life of the sensor depend on the state of sliding contact and the life of the sliding contact portion, since no sliding contact portions are provided in the conductive paths for deriving the electrostatic capacitances. However, the sensor shown in FIGS. 8A and 8B has the following problem:

The electrostatic capacitance which is formed by the first fixed electrode 13 and the first fixed split electrode member 16 or by the first fixed electrode 13 and the second fixed split electrode member 17 is maximized when the rotational plate 15 completely overlaps with the first or second fixed split electrode member 16 or 17. Assuming that the rotational plate 15 is positioned at the center of the space between the firsthand second fixed electrodes 13 and 14, the maximum electrostatic capacitance $C_{MAX}$ is expressed as follows:

$$C_{MAX} = \epsilon_0 \epsilon_s S / \{(D-T)\epsilon_s + T\} \quad (1)$$

where D represents the space between the first and second fixed electrodes 13 and 14, T represents the thickness of the rotational plate 15, S represents the area of opposition of the first fixed electrode 13 and the first or second fixed split electrode member 16 or 17, $\epsilon_0$ represents the dielectric constant of a vacuum, and $\epsilon_s$ represents the relative dielectric constant of the rotational plate 15.

On the other hand, the electrostatic capacitance which is formed by the first fixed electrode 13 and the first fixed split electrode member 16 is minimized when no rotational plate 15 is provided therebetween. Similarly the electrostatic capacitance which is formed by the first fixed electrode 13 and the second fixed split electrode member 17 is also minimized when no rotational plate 15 is provided therebetween. Such a minimum electrostatic capacitance $C_{MIN}$ is expressed as follows:

$$C_{MIN} = \epsilon_0 S / D \quad (2)$$

Thus, the difference $\Delta C$ between the maximum and minimum values $C_{MAX}$ and $C_{MIN}$ is expressed as follows:

$$\Delta C = C_{MAX} - C_{MIN} \quad (3)$$
$$= \epsilon_0(\epsilon_s - 1)ST/[D\{D\epsilon_s - T(\epsilon_s - 1)\}]$$

From the equation (3), it is understood that it is possible to increase the difference $\Delta C$ as the space (D−T)/2 between the rotational plate 15 and the first or second fixed electrode 13 or 14 is reduced. In this case, the rotational plate 15 must be positioned at the center of the space D between the first and second fixed electrodes 13 and 14, as described above. While this condition is satisfied, however, reduction of the aforementioned space (D−T)/2 is limited. In relation to this, Japanese Patent Application Laying-Open No. 4-172218 (1992) discloses no means for adjusting the rotational plate 15 for positioning the same at the center of the space D between the first and second fixed electrodes 13 and 14.

From the equation (3), it is also understood that it is possible to increase the difference ΔC as the area S of opposition is increased. If the area S of opposition is increased, however the overall sensor is undesirably increased in size. Therefore, this means cannot be simply employed. Further, while substantial increase of the minimum electrostatic capacitance is inhibited, increase of the area S of opposition is limited, because the minimum electrostatic capacitance is influenced by the area S of the fixed electrode 13 and the fixed split electrode member 16 or 17 as well as the space D between them.

While it is possible to increase the difference ΔC between the maximum and minimum electrostatic capacitances by reducing the space (D−T)/2 between the rotational plate 15 and the first or second fixed electrode 13 or 14 or increasing the area S of opposition of the first fixed electrode 13 and the first or second fixed split electrode member 16 or 17 in the sensor shown in FIGS. 8A and 8B as hereinabove described, increase of the difference ΔC is limited in either case. Thus, it is impossible to remarkably improve rotation angle detection sensitivity of this sensor.

SUMMARY OF THE INVENTION

Accordingly, an object of the present invention is to provide a capacitance type rotation angle sensor having no sliding contact portions in conductive paths for deriving electrostatic capacitances, which can increase a variable range of the electrostatic capacitances.

The capacitance type rotation angle sensor according to the present invention comprises a plurality of fixed electrode means which are arranged in parallel with each other at a prescribed space, plate-shaped movable electrode means which is arranged between the fixed electrode means in parallel therewith in a state being electrically insulated from the fixed electrode means, a shaft holding the movable electrode means for rotating the same with respect to the fixed electrode means about a central axis which is perpendicular to a plate surface of the movable electrode means, and first and second external terminals. Each of the fixed electrode means comprises first and second fixed split electrode members which are split so as not to conduct with each other. The movable electrode means comprises first and second movable split electrode members which are split so as not to conduct with each other. This sensor further comprises first conductive means for electrically connecting the first fixed split electrode members with each other and with the first external terminal, and second conductive means for electrically connecting the second fixed split electrode members with each other and with the second external terminal.

According to the present invention, as hereinabove described, the first and second external terminals are electrically connected with the first and second fixed split electrode members provided on the fixed sides respectively, whereby it is not necessary to provide the first and second conductive means, implementing such electrical connection, with sliding contact portions. Consequently, it is possible to stabilize the electrical properties of the sensor and to increase its life.

According to the present invention, further, the fixed electrode means and the movable electrode means comprise the first and second fixed split electrode members and the first and second movable split electrode members, which are split not to conduct with each other, respectively. Briefly stated, the maximum electrostatic capacitance provided by this sensor is determined by areas of opposition of the fixed and movable split electrode members. Thus, it is possible to increase the maximum electrostatic capacitance by increasing the areas of opposition. On the other hand, the minimum electrostatic capacitance provided by this sensor is hardly influenced by the aforementioned areas of opposition. Therefore, it is possible to increase the areas of opposition for increasing the maximum electrostatic capacitance substantially with no influence on the minimum value, whereby the variable range of the electrostatic capacitances can be easily increased.

Preferably, the sensor according to the present invention further comprises means for adjusting the spaces between the fixed electrode means and the movable electrode means. According to this space adjusting means, it is possible to easily set the fixed and movable electrode means in proper positional relation to each other. Thus, it is possible to reduce deviation of electrostatic capacitances provided by respective ones of a plurality of such sensors, thereby improving accuracy of standard electrostatic capacitances of the respective sensors. Further, it is possible to prevent abnormal reduction in withstand voltage of the sensor caused by abnormal approach of the fixed and movable electrode means.

According to the present invention, the number of the fixed electrode means is at least 2, and that of the movable electrode means is at least 1. However, the numbers of the fixed and movable electrode means can be increased at need. It is possible to further increase the maximum electrostatic capacitance by increasing the numbers of the fixed and movable electrode means respectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
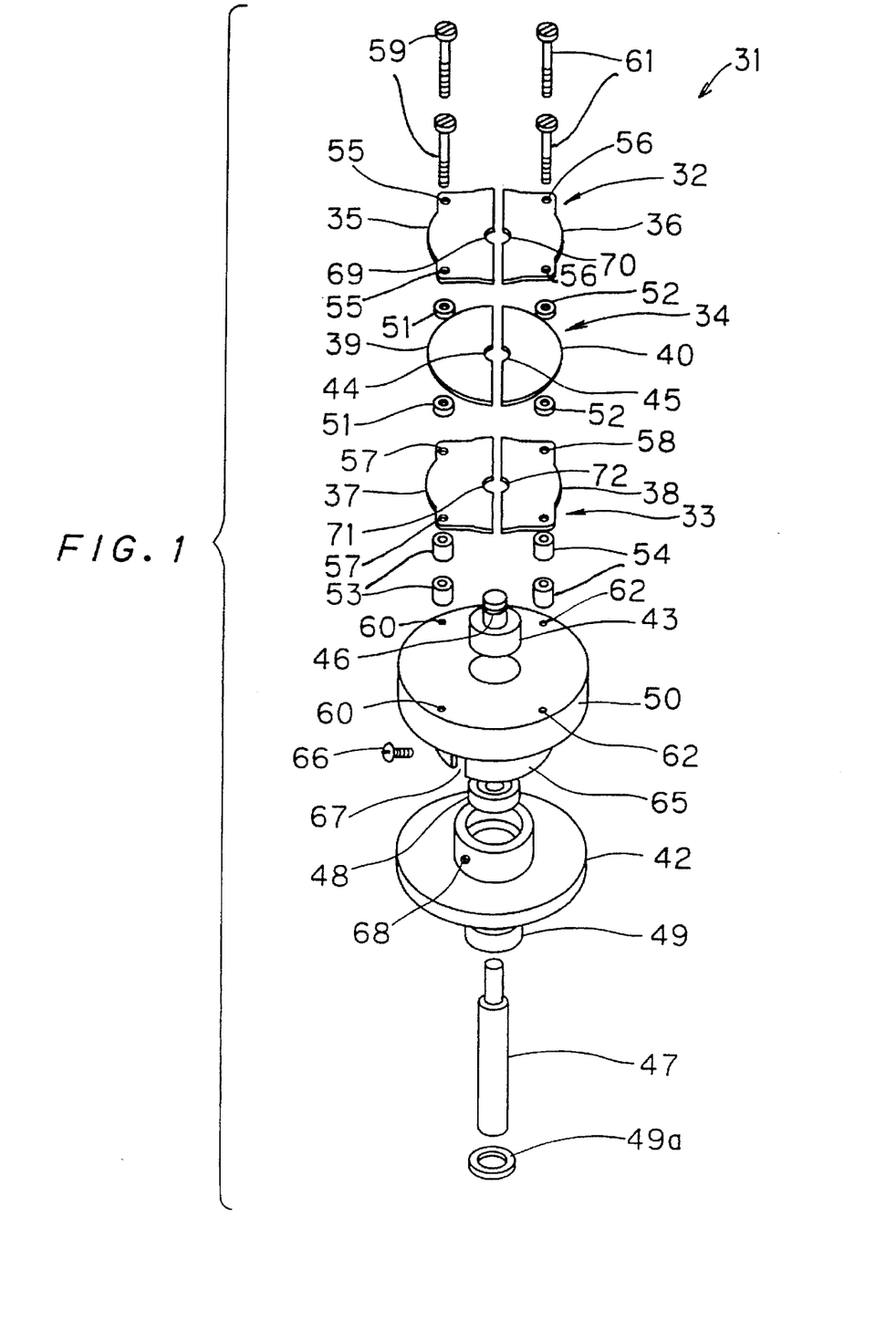
FIG. 1 is a perspective view illustrating elements included in a capacitance type rotation angle sensor according to an embodiment of the present invention in an exploded manner.
Figure 2:
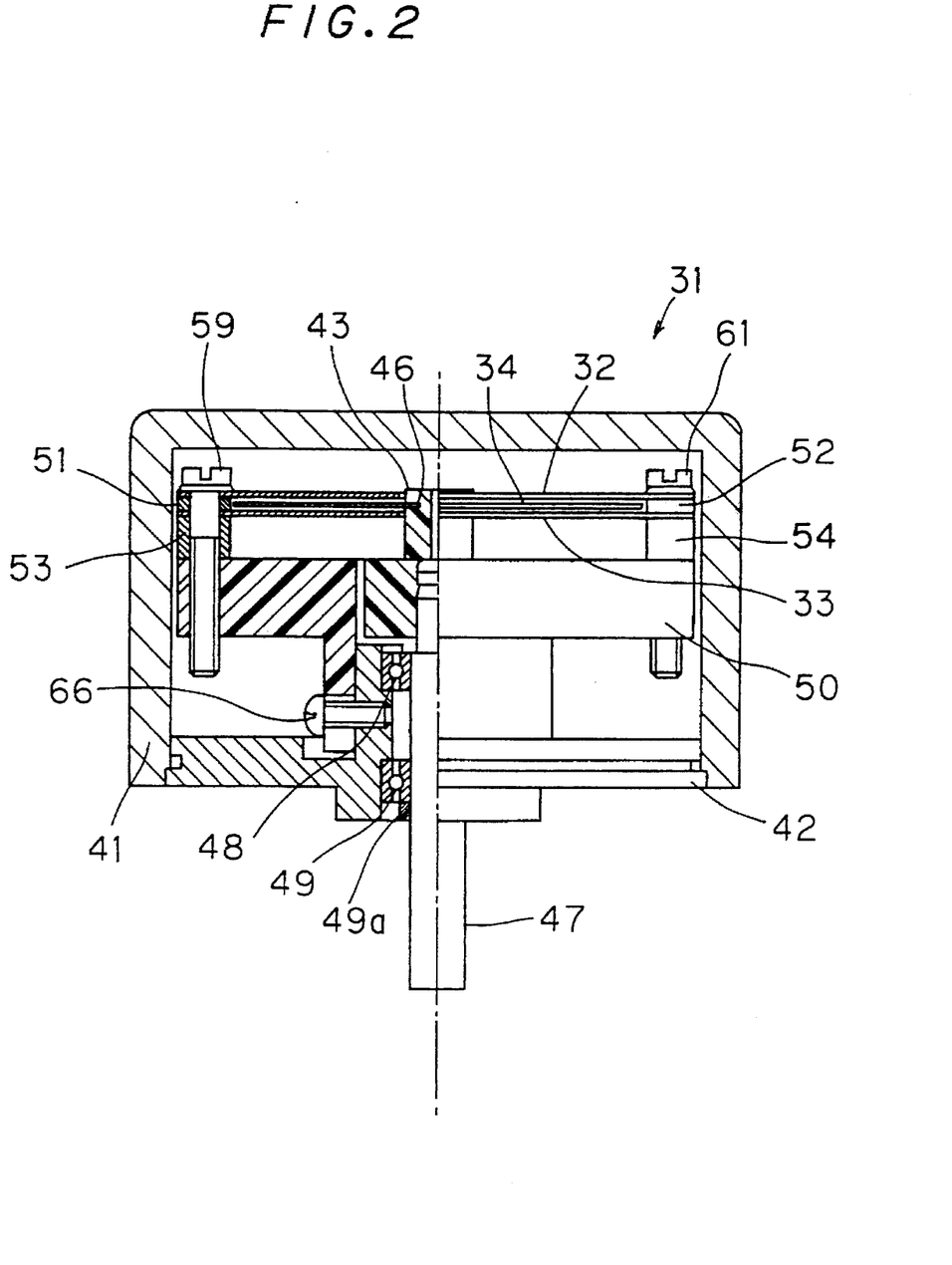
FIG. 2 is a longitudinal sectional view of the sensor shown in FIG. 1, with a cap added.

Referring to FIGS. 1 and 2, a capacitance-type rotation angle sensor 31 according to an embodiment of the present invention comprises first and second fixed electrodes 32 and 33 which are arranged in parallel with each other at a prescribed distance, and a movable electrode 34 which is arranged between the fixed electrodes 32 and 33 in parallel therewith in a state being electrically insulated from the fixed electrodes 32 and 33. The fixed electrodes 32 and 33 and the movable electrode 34 are in the form of plates respectively.

The first fixed electrode 32 comprises first and second fixed split electrode members 35 and 36 which are split so as not to conduct with each other. Similarly, the second fixed electrode 33 comprises first and second fixed split electrode members 37 and 38. Further, the movable electrode 34 comprises first and second movable split electrode members 39 and 40 which are split so as not to conduct with each other. These electrode members 35 to 40 are formed by plates consisting of a conductive material such as a metal respectively. Alternatively, the electrode members 35 to 40 may be provided by conductive films which are formed by plating or the like on surfaces of plates consisting of an electric insulating material such as a resin.

This sensor 31 comprises a cap 41 and a bottom cover 42 closing an opening of the cap 41, as a housing. The cap 41 and the bottom cover 42 are preferably made of conductive materials and ground-connected, so that elements arranged in a space defined by these members are not influenced by a stray capacitance. If such an advantage is not desired, however, at least one of the cap 41 and the bottom cover 42 may be made of an electric insulating material.

The movable electrode 34 is held by a shaft 43, to be rotated with respect to the fixed electrodes 32 and 33 about a central axis which is perpendicular to its plate surface. In more concrete terms, the first and second movable split electrode members 39 and 40 are provided with notches 44 and 45, while the shaft 43 is provided with a groove 46. Edge portions of the movable split electrode members 39 and 40 defining the notches 44 and 45 are engaged in the groove 46, so that the movable split electrode members 39 and 40 are mounted on the shaft 43. The movable split electrode members 39 and 40 may be bonded to the shaft 43 with an adhesive or the like, or the former may be mounted on the latter in another mounting structure.

The shaft 43 is made of an electric insulating material such as resin, for example. Another shaft 47 of a metal is coupled to a lower end portion of this shaft 43. The shaft 47, passing through the bottom cover 42, is rotatably held with respect to the bottom cover 42 through bearings 48 and 49. The bearing 49 is mounted on the shaft 47 by a bushing 49a. An object (not shown) of detection is coupled to an end portion of the shaft 47 derived from the bottom cover 42, so that the shaft 47 is rotated in correspondence to a rotation angle to be detected. The shaft 43 is integrally rotated with the shaft 47, whereby the movable electrode 34 is rotated with respect to the fixed electrodes 32 and 33.

The first and second fixed electrodes 32 and 33 are held by a stator 50 which is made of an electric insulating material such as resin, for example. In more concrete terms, washer-type spacers 51 and 52 of a conductive material are interposed between the fixed split electrode members 35 and 37 and between the fixed split electrode members 36 and 38 respectively. Further, cylindrical spacers 53 and 54 of a conductive material are interposed between the fixed split electrode members 37 and 38 and the stator 50 respectively. Thus, the first and second fixed electrodes 32 and 33 and the stator 50 are maintained at prescribed distances. Further, the fixed split electrode members 35 to 38 are provided with mounting holes 55 to 58 respectively. Attaching screws 59 are inserted to pass through the mounting holes 55, the spacers 51, the mounting holes 57 and the spacers 53, and fitted in screw holes 60 which are provided in the stator 50. Similarly, attaching screws 61 are inserted to pass through the mounting holes 56, the spacers 52, the mounting holes 58 and the spacers 54, and fitted in screw holes 62 which are provided in the stator 50.

Figure 3A:
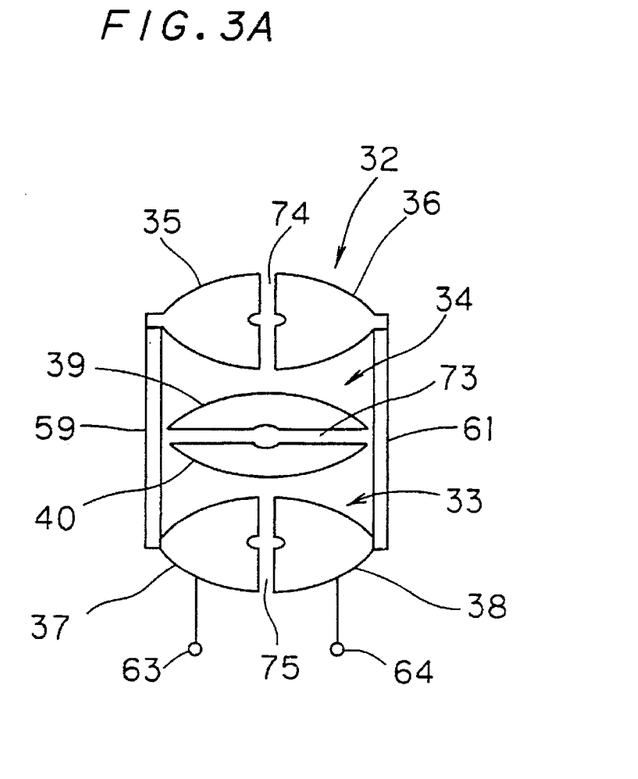
FIG. 3A is a perspective view illustrating positional relation between fixed electrode means and movable electrode means in the sensor shown in FIG. 1 for providing the maximum electrostatic capacitance.

Thus, the first and second fixed electrodes 32 and 33 are held by the stator 50, while the first and second fixed split electrode members 35 and 37 are electrically connected with each other by the spacers 51 and the attaching screws 59 and the second fixed split electrode members 36 and 38 are electrically connected with each other by the spacers 52 and the attaching screws 61. Further, the fixed split electrode members 37 and 38 are electrically connected to external terminals 63 and 64 respectively, as shown in FIG. 3A.

The stator 50 is mounted on the bottom cover 42 in a position-controllable manner. In more concrete terms, the stator 50 is provided on its lower portion with a cylindrical sleeve 65, which is provided with a notch 67 vertically extending a relatively large distance for receiving an attaching screw 66. The attaching screw 66 is engaged with an edge portion defining the botch 67, to be fitted in a screw hole 68 provided in the bottom cover 42.

The position of the stator 50 with respect to the bottom cover 42 can be changed in a range of the vertical length of the notch 67. Thus, it is possible to easily adjust the space between the first fixed electrode 32 and the movable electrode 34, and that between the second fixed electrode 33 and the movable electrode 34, to be equal to each other. When these spaces are set to be equal to each other, it is possible to reduce deviation of electrostatic capacitances between a plurality of sensors 31 as obtained, thereby improving accuracy of standard values of the electrostatic capacitances. The sleeve 65 may alternatively be provided with a slot, in place of the aforementioned notch 67. Further, the sizes of the spacers 51 to 54 may be varied in order to adjust the positions of the fixed electrodes 32 and 33 with respect to the movable electrode 34.

The fixed split electrode members 35 to 38 are preferably not in contact with the shaft 43. Therefore, the fixed split electrode members 35 to 38 are provided with notches 69 to 72 respectively.

The variable range of the electrostatic capacitances provided by the aforementioned sensor 31 is now described.

When a gap 73 between the movable split electrode members 39 and 40 is perpendicular to gaps 74 and 75 between the fixed split electrode members 35 and 36 and between the fixed split electrode members 37 and 38 as shown in FIG. 3A, the sensor 31 provides the maximum electrostatic capacitance $C_{MAX}$. At this time, the sensor 31 provides an equivalent circuit shown in FIG. 3B.

Figure 3B:
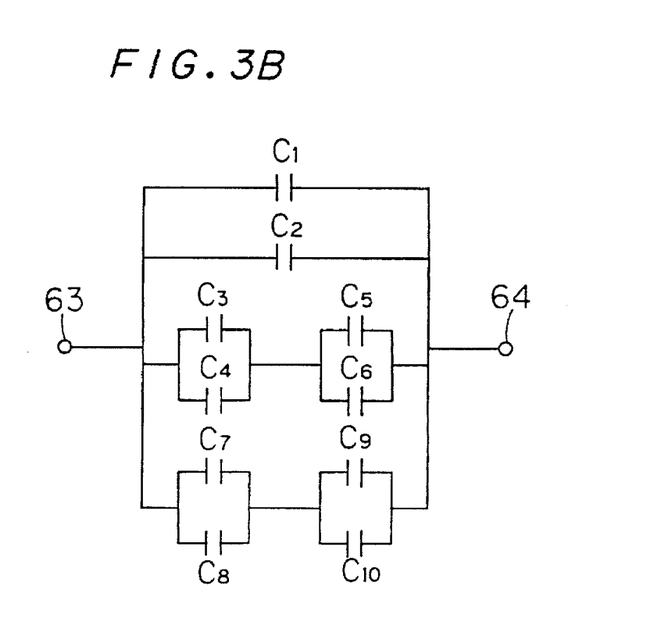
FIG. 3B shows an equivalent circuit provided in the state shown in FIG. 3A.

Referring to FIG. 3B, symbol $C_1$ represents an electrostatic capacitance which is formed in the gap 74, and symbol $C_2$ represents that formed in the gap 75. Symbols $C_3$, $C_4$, $C_5$ and $C_6$ represent electrostatic capacitances which are formed between the first movable split electrode member 39 and the fixed split electrode members 35, 36, 37 and 38 respectively. Symbols $C_7$, $C_8$, $C_9$ and $C_{10}$ represent electrostatic capacitances which are formed between the second movable split electrode member 40 and the fixed split electrode members 35, 36, 37 and 38 respectively. It is understood from FIG. 3B that the total electrostatic capacitance derived by the external terminals 63 and 64, i.e., the maximum electrostatic capacitance $C_{MAX}$, is expressed as follows:

$$C_{MAX}=C_1+C_2+(C_3+C_4)(C_5+C_6)/\{(C_3+C_4)+(C_5+C_6)\}+(C_7+C_8)(C_9+C_{10})/\{(C_7+C_8)+(C_9+C_{10})\} \quad (4)$$

Figure 4A:
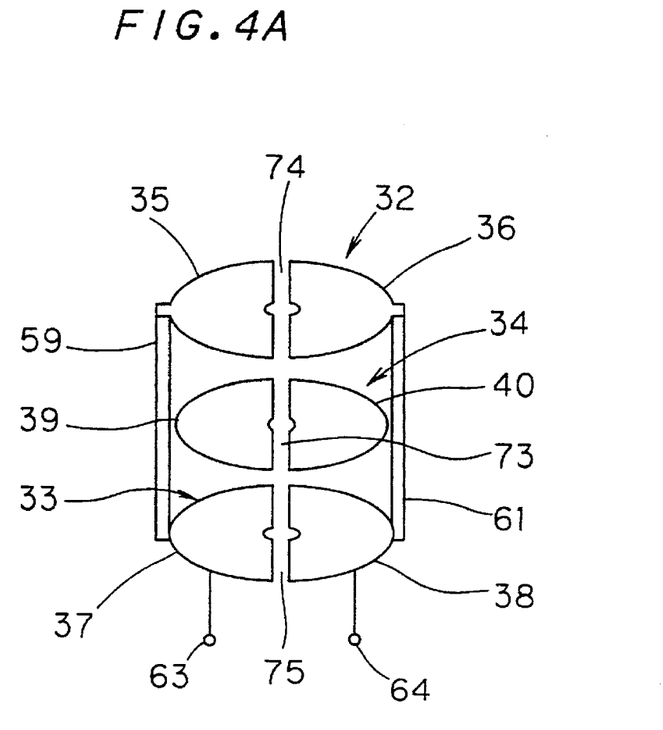
FIG. 4A is a perspective view illustrating positional relation between the fixed electrode means and the movable electrode means in the sensor shown in FIG. 1 for providing the minimum electrostatic capacitance.
Figure 4B:
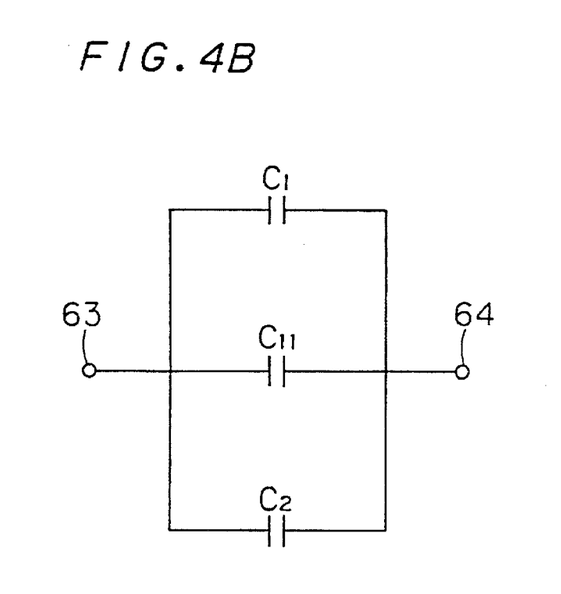
FIG. 4B shows an equivalent circuit provided in the state shown in FIG. 4A.

When the gap 73 between the movable split electrode members 39 and 40 is in parallel with the gaps 74 and 75 between the fixed split electrode members 35 and 36 and between the fixed split electrode members 37 and 38 as shown in FIG. 4A, on the other hand, the sensor 31 provides the minimum electrostatic capacitance $C_{MIN}$. FIG. 4B shows an equivalent circuit provided at this time.

Referring to FIG. 4B, symbol $C_{11}$ represents the total electrostatic capacitance of a series electrostatic capacitance provided by the split electrode members 35, 39, 40 and 36 and that provided by the split electrode members 37, 39, 40 and 38. It is understood from FIG. 4B that the total electrostatic capacitance derived by the external terminals 63 and 64, i.e., the minimum electrostatic capacitance $C_{MIN}$, is expressed as follows:

$$C_{MIN}=C_1+C_2+C_{11} \quad (5)$$

In a state providing such a minimum value $C_{MIN}$, the electrostatic capacitance $C_{11}$ is extremely small. Further, the electrostatic capacitances $C_1$ and $C_2$ are not occupied by areas of opposition of the first and second fixed electrodes 32 and 33 and the movable electrode 34. When the areas of opposition of the fixed electrodes 32 and 33 and the movable electrode 34 are increased in order to increase the maximum electrostatic capacitance $C_{MAX}$, therefore, substantially no influence is exerted on the minimum value $C_{MIN}$. Consequently, it is possible to easily increase the difference between the maximum and minimum electrostatic capacitances $C_{MAX}$ and $C_{MIN}$, i.e., the variable range of the electrostatic capacitances.

Figure 5:
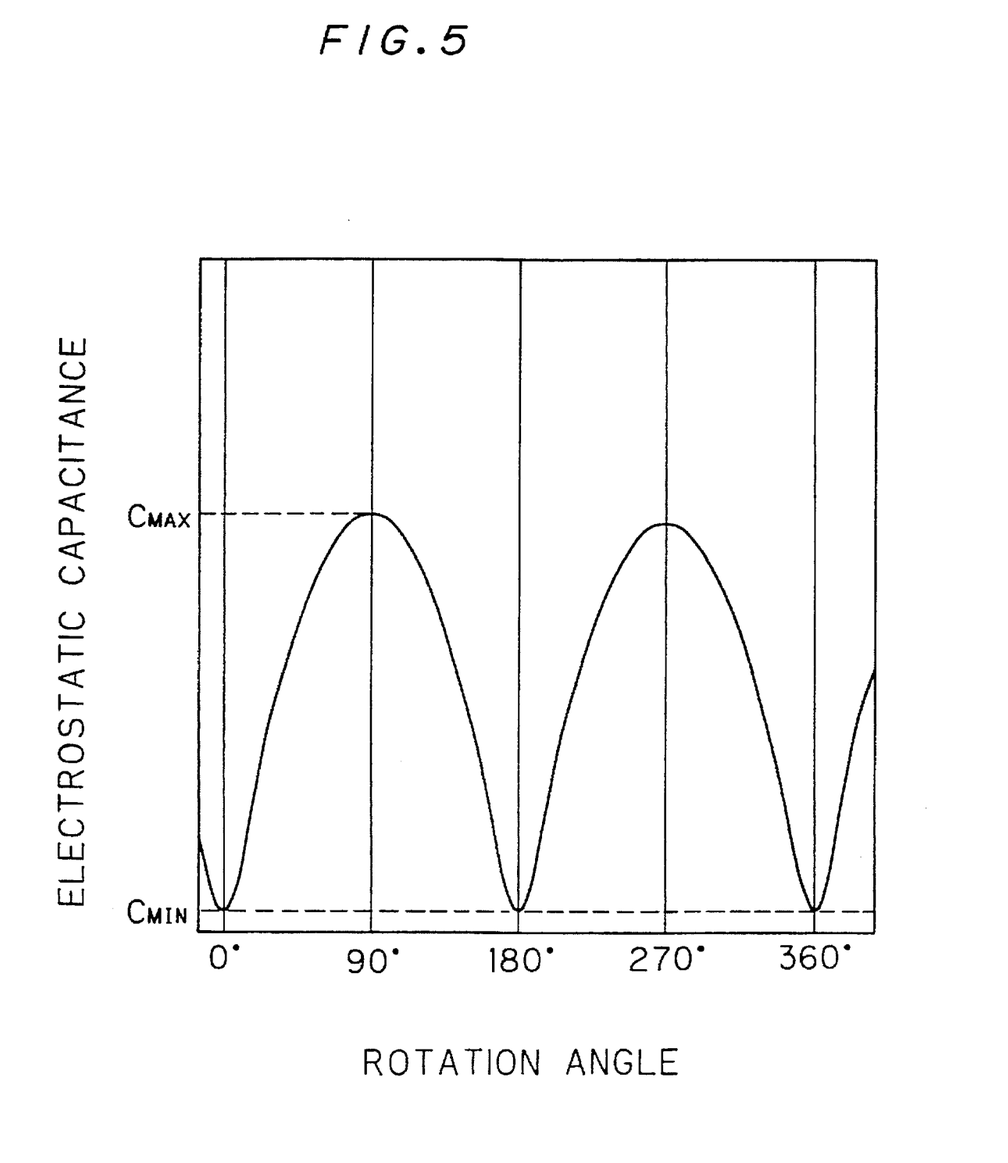
FIG. 5 illustrates electrostatic capacitances provided by the sensor shown in FIG. 1 in relation between the same and rotation angles of the movable electrode means.

FIG. 5 shows electrostatic capacitances provided by the sensor 31, which are varied with changes of rotation angles of the movable electrode 34.

While the sensor 31 according to the aforementioned embodiment comprises two fixed electrodes 32 and 33 and one movable electrode 34, the number of such combination of the fixed and movable electrodes may be further increased, as described later with reference to FIG. 6. It is possible to increase the maximum electrostatic capacitance as provided, by increasing the number of combination of the fixed and movable electrodes. On the other hand, the minimum electrostatic capacitance is not much increased upon such increase in number of combination of the fixed and movable electrodes. Consequently, it is possible to further increase the variable range of the electrostatic capacitances.

Figure 6:
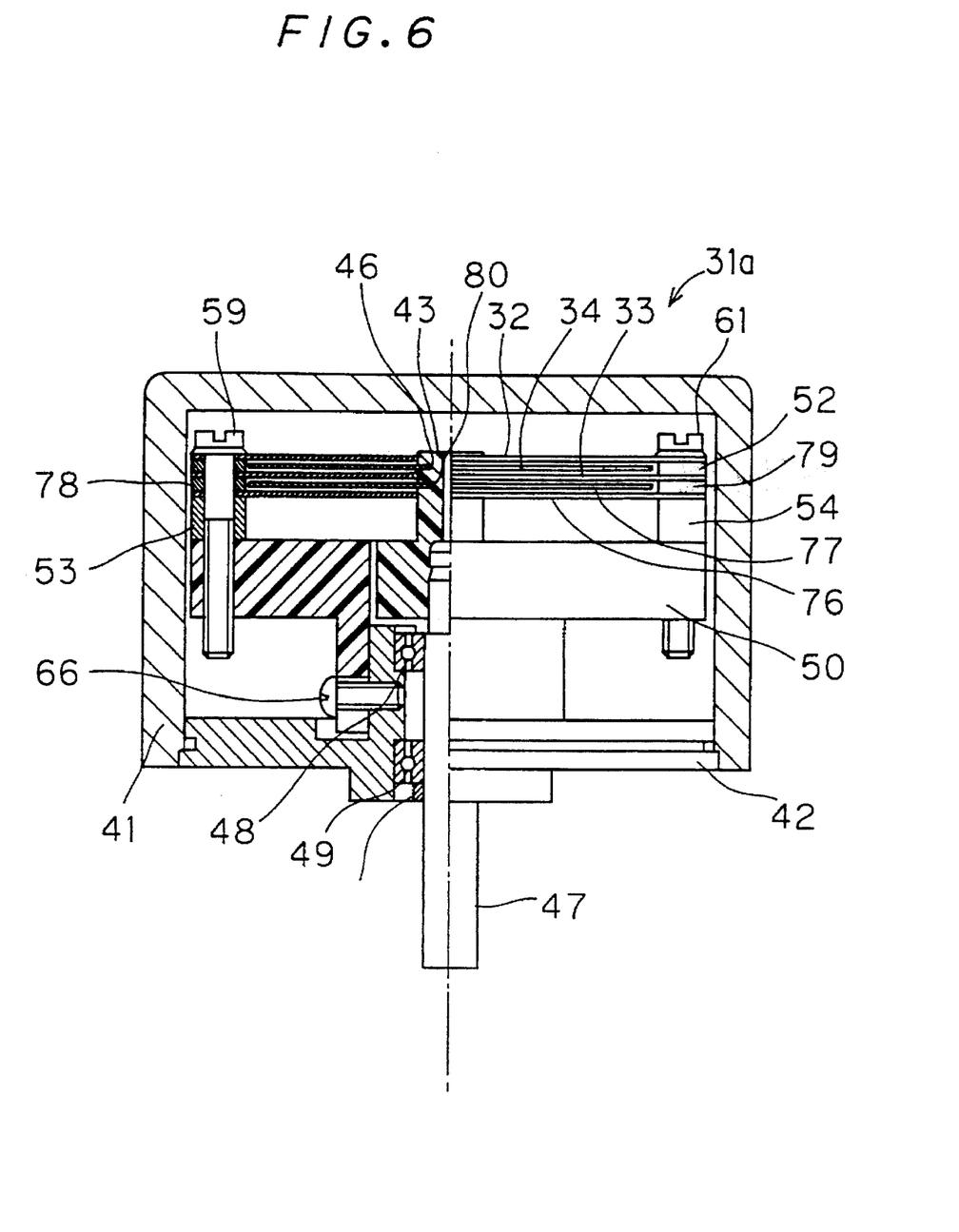
FIG. 6 is a longitudinal sectional view showing a capacitance type rotation angle sensor according to another embodiment of the present invention.

FIG. 6 is a sectional view corresponding to FIG. 2, showing a capacitance-type rotation angle sensor 31a according to another embodiment of the present invention. Referring to FIG. 6, elements corresponding to those shown in FIG. 2 are denoted by similar reference numerals, to omit redundant description.

The sensor 31a shown in FIG. 6 comprises a third fixed electrode 76, a second movable electrode 77 and spacers 78 and 79, in addition to the elements corresponding to those included in the sensor 31 shown in FIG. 2. Further, a shaft 43 and attaching screws 59 and 61 are increased in length as compared with those shown in FIG. 2. In addition, the shaft 43 is provided with a further groove 80 for positioning the second movable electrode 77.

While the shaft 43 is made of an electric insulating material in each of the aforementioned embodiments, the same may alternatively be made of a metal so that only a portion to be in contact with the movable electrode 34 (and 77) is covered with an electric insulating material.

While the shaft 47 of a metal is coupled to the electrically insulating shaft 43 in each of the aforementioned embodiments, these shafts 43 and 47 may alternatively be formed by an integral component of an electric insulating material.

Although the present invention has been described and illustrated in detail, it is clearly understood that the same is by way of illustration and example only and is not to be taken byway of limitation, the scope of the present invention being limited only by the terms of the appended claims.

What is claimed is:

1. A capacitive rotation angle sensor comprising
   a first fixed electrode which is divided by a first gap and which comprises two electrode members;
   a second fixed electrode which is divided by a second gap and which comprises two electrode members, the electrode members of said second electrode being arranged opposite to the electrode members of said first electrode, and said second gap being in alignment with said first gap,
   two terminals, each of said terminals being connected to a respective electrode member of each of said first and second electrodes,
   a rotationally movable electrode, which is divided into two electrode members by a third gap which is between said first and second electrodes and which is adapted to be rotationally moved between a first position with minimum capacitance between the terminals and a second position with maximum capacitance between the terminals;
   said first position being a position at which the third gap is in alignment with said first and second gaps and said second position being a position at which said third gap extends at right angles to said first and second gaps.

2. A capacitive rotation angle sensor according to claim 1, further comprising a device for adjusting spacings between said fixed electrodes and said movable electrode.

3. A capacitive rotation angle sensor according to claim 2, wherein said adjusting device comprises a stator; a first spacer arranged between said stator and the two electrode members of the first fixed electrode, and a second spacer arranged between said stator and the two electrode members of the second fixed electrode.

4. A capacitive rotation angle sensor according to claim 3, wherein said stator has a controllable position in a direction for adjusting said spacings.

5. A capacitive rotation angle sensor according to claim 3, wherein in that the stator holds said first and second spacers in a condition in which they are electrically insulated from each other, said first and second spacers having conductivity.

6. A capacitive rotation angle sensor according to claim 1, wherein said fixed electrodes are in the form of plates.

7. A capacitive rotation angle sensor according to claim 6, wherein said rotationally movable electrodes are in the form of plates.

8. A capacitive rotation angle sensor according to claim 1, further comprising a housing for accommodating said fixed electrodes and said movable electrode, and a shaft partially projecting from said housing.

9. A capacitive rotation angle sensor according to claim 8, wherein said housing has conductivity.

10. A capacitive rotation angle sensor according to claim 9, wherein said shaft extends to said movable electrode for rotating the same.

11. A capacitive rotation angle sensor according to claim 10, wherein said shaft extends through said gap in said second fixed electrode to reach said movable electrode.

12. A capacitive rotation angle sensor according to claim 11, wherein said shaft further extends through said stator.

13. A capacitive rotation angle sensor according to claim 8, wherein said shaft extends to said movable electrode for rotating the same.

14. A capacitive rotation angle sensor according to claim 13, wherein said shaft extends through said gap in said second fixed electrode to reach said movable electrode.

15. A capacitive rotation angle sensor according to claim 14, wherein said shaft further extends through said stator.

* * * * *